(12) United States Patent
Gornick et al.

(10) Patent No.: US 6,698,965 B2
(45) Date of Patent: Mar. 2, 2004

(54) SHIM CARRIER ASSEMBLY

(75) Inventors: Steven W. Gornick, Fenton, MI (US); Michael A. Van Camp, Swartz Creek, MI (US)

(73) Assignee: General Motors Corporation, Detroit, MI (US)

( * ) Notice: Subject to any disclaimer, the term of this patent is extended or adjusted under 35 U.S.C. 154(b) by 13 days.

(21) Appl. No.: 10/062,371

(22) Filed: Feb. 1, 2002

(65) Prior Publication Data

US 2003/0147692 A1 Aug. 7, 2003

(51) Int. Cl.$^7$ ................................................. F16B 37/04
(52) U.S. Cl. ..................... 403/287; 403/393; 403/408.1
(58) Field of Search ................... 403/326, 327, 403/329, 344, 341, 393, 286, 287, 11, 384, 2

(56) References Cited

U.S. PATENT DOCUMENTS

| | | | |
|---|---|---|---|
| 3,881,676 A | * | 5/1975 | Reinwall ................ 403/329 X |
| 5,314,380 A | | 5/1994 | Yamamoto |
| 5,452,548 A | | 9/1995 | Kwon |
| 5,469,931 A | | 11/1995 | Kawata et al. |
| 5,551,783 A | | 9/1996 | Whitney et al. |
| 5,653,550 A | * | 8/1997 | Mutz et al. ................. 403/329 |
| 5,695,296 A | * | 12/1997 | Miura ........................... 403/2 |
| 5,703,796 A | | 12/1997 | Moradi et al. |
| 5,829,892 A | | 11/1998 | Groves |
| 6,176,634 B1 | * | 1/2001 | Yamashita .............. 403/329 X |
| 6,527,471 B2 | * | 3/2003 | Smith et al. ............ 403/329 X |

* cited by examiner

Primary Examiner—John R. Cottingham
(74) Attorney, Agent, or Firm—Leslie C. Hodges

(57) ABSTRACT

A shim carrier assembly for optionally retaining shims therein, wherein the carrier has at least three intercontiguated planar portions with holes or slots therein, such that a fastener may be inserted through the holes or slots for aiding in the shimming of fastened components.

11 Claims, 4 Drawing Sheets

SHIM CARRIER ASSEMBLY

TECHNICAL FIELD

The present invention relates generally to mechanical fasteners and more particularly to mechanical fasteners used in conjunction with shims.

BACKGROUND OF THE INVENTION

A rear wheel drive vehicle typically includes a transmission having an output shaft connected through an elongated driveshaft to an axle assembly. The driveshaft typically comprises two or more propeller shafts which are connected with a universal joint.

One of the propeller shafts is supported by a center bearing secured to the underbody of the motor vehicle. The driveline is positioned for proper orientation and alignment by placing shims or washers during installation between the center bearing and underbody.

Various mounting and positioning schemes are disclosed in the prior art for insuring driveline propeller shaft alignment with the center bearing and the vehicle body. Currently, manufacturers use washers to shim propeller shafts. However, the use of loose shims or washers is cumbersome in the assembly plant environment.

U.S. Pat. No. 5,469,931 to Kawata et al. describes an attachment means provided by engaging serrations and a locking nut for connecting and aligning the propeller shafts with the center bearing. U.S. Pat. No. 5,829,892 to Groves discloses a center bearing collar assembly having a bearing race with a rigid fixed mounting scheme requiring washer shims to provide incremental changes in vertical alignment.

U.S. Pat. No. 5,314,380 to Yamamoto teaches an improved structure of a universal joint for reducing swing torque having a spider axially rotated on a bearing cup with no shim means provided for self-retaining to the floor pan. U.S. Pat. No. 5,452,548 to Kwon also teaches a bearing structure with an isolation and anchor device for supporting bridges and other vertical structures formed with a multi-layer pattern of metal plates and bars located in the center bearing unit to improve vertical resistance as well as horizontal and torsional rigidity.

U.S. Pat. No. 5,703,796 to Moradi et al. relates to an apparatus and method for aligning a driveline in a motor vehicle by positioning a center bearing to the body of the motor vehicle to further support the driveshaft. The position of the driveline is then measured and a shim thickness is calculated for installation between the center bearing and the body. None of the five recited prior art patents either teach or disclose the subject invention shim carrier assembly and self-retaining feature.

SUMMARY OF THE INVENTION

The present invention overcomes the prior art disadvantages by providing self-retaining attachment means between the driveline, center bearing, and underbody when the propeller shaft assembly is installed to the vehicle. The self-retaining attachment means is provided with a shim stock common carrier of various shim thicknesses for proper alignment. Without the common carrier and self-retaining feature, shims must be placed over each stud while the propeller shaft is being attached to the vehicle underbody.

It is an object of the present invention to minimize the number of sub-component shims by allowing shim stock of various thicknesses to be assembled into a common carrier. This overcomes an inherent disadvantage in prior art attachment schemes for mounting the propeller shaft and center bearing assembly to the propeller attachment studs in the floorpan. Without the common carrier and self-retaining shim stock feature of the present invention, shims must be manually placed over each stud while the propeller shaft and center bearing assembly is being attached to the underbody.

The common shim carrier assembly slides onto the propeller shaft center bearing to allow the propeller shaft center joint to operate at the desired orientation. This is achieved because the shims are positioned between the propeller shaft center bearing and the body when the propeller shaft is installed to vehicle floorpan. Ultimate retention of the shim carrier is achieved with the fasteners that hold the propeller shaft to the body.

The present invention overcomes the disadvantages of the prior art approaches and simplifies the attachment schemes by providing a common shim carrier formed from malleable sheet metal or other material preferably in a substantially flattened "I" shape having three layered intercontiguated planar portions, generally parallel to one another and provided with holes or slots for attachment and alignment through the three planar portions.

Other features, objects, and advantages of the present invention will be become apparent from the following detailed description of the drawings, the preferred embodiments, and the claims.

DESCRIPTION OF THE PREFERRED EMBODIMENT

Figure 1:
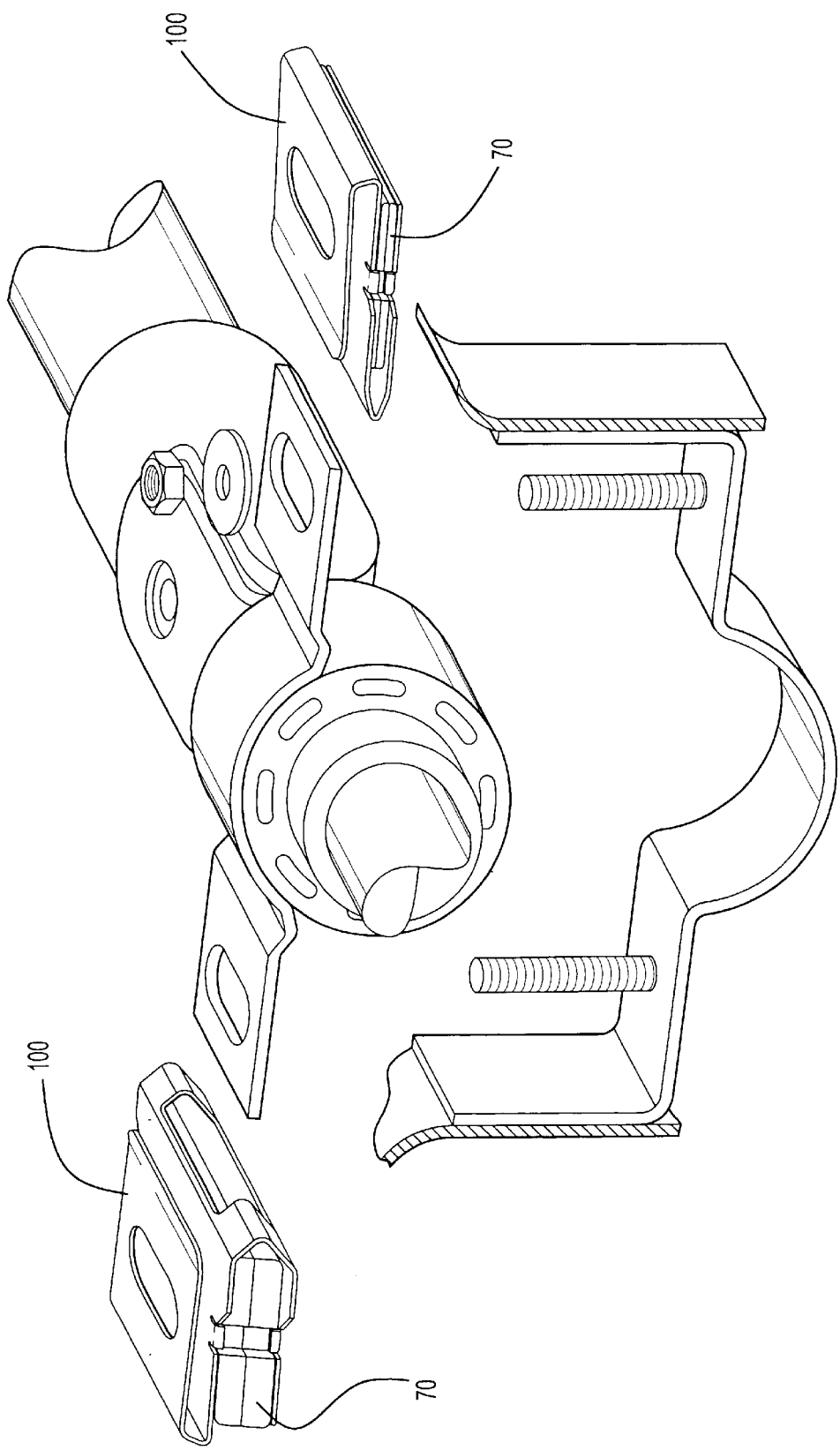
FIG. 1 shows an exploded perspective assembled view of the preferred essentially "S" shaped embodiment of the common shim carrier (100) with the yoke and center bearing assembly.

To assist the reader in understanding the present invention, all reference numbers used herein are summarized in the table below, along with the elements they represent as shown in FIGS. 1–6 of the drawings:

10=First planar portion
11=First end edge
12=Hole or slot in first planar portion
13=Lateral edge(s) of first planar portion
14=Tab formed along lateral edge 13
15=Notch(es) on either side of tab 14
16=First transition portion
17=First contiguated edge
18=Second contiguated edge
20=Second planar portion 22=Hole or slot in second planar portion
23=Lateral edge(s) of second planar portion
24=Tab formed along lateral edge 23
25=Notch(es) on either side of tab 24
26=Second transition portion
27=Third contiguated edge
28=Fourth contiguated edge
30=Third planar portion
31=Second end edge
32=Hole or slot in third planar portion
33=Lateral edge(s) of third planar portion
37=Fold line
39=Folded-up flap
70=Shim
72=Hole or slot in shim
73=Lateral edge(s) of shim
74=Relief formed along lateral (73)
100=Carrier
T=Thickness of shim The shim carrier assembly as generally represented in the subject invention and further defined by the preferred embodiment comprises an essentially "S" shaped shim carrier 100, formed from malleable sheet metal and substantially flattened with first 10, second 20 and third 30 layered intercontiguated folded planar portions, generally parallel to each other and provided with common holes or slots 12, 22, 32 for engaging and positioning a perpendicular fastener shaft for mounting the propeller shaft, yoke, and center bearing assembly to the underbody floorpan. At least one shim 70 can be disposed between any two of the planar portions.

Figure 2:
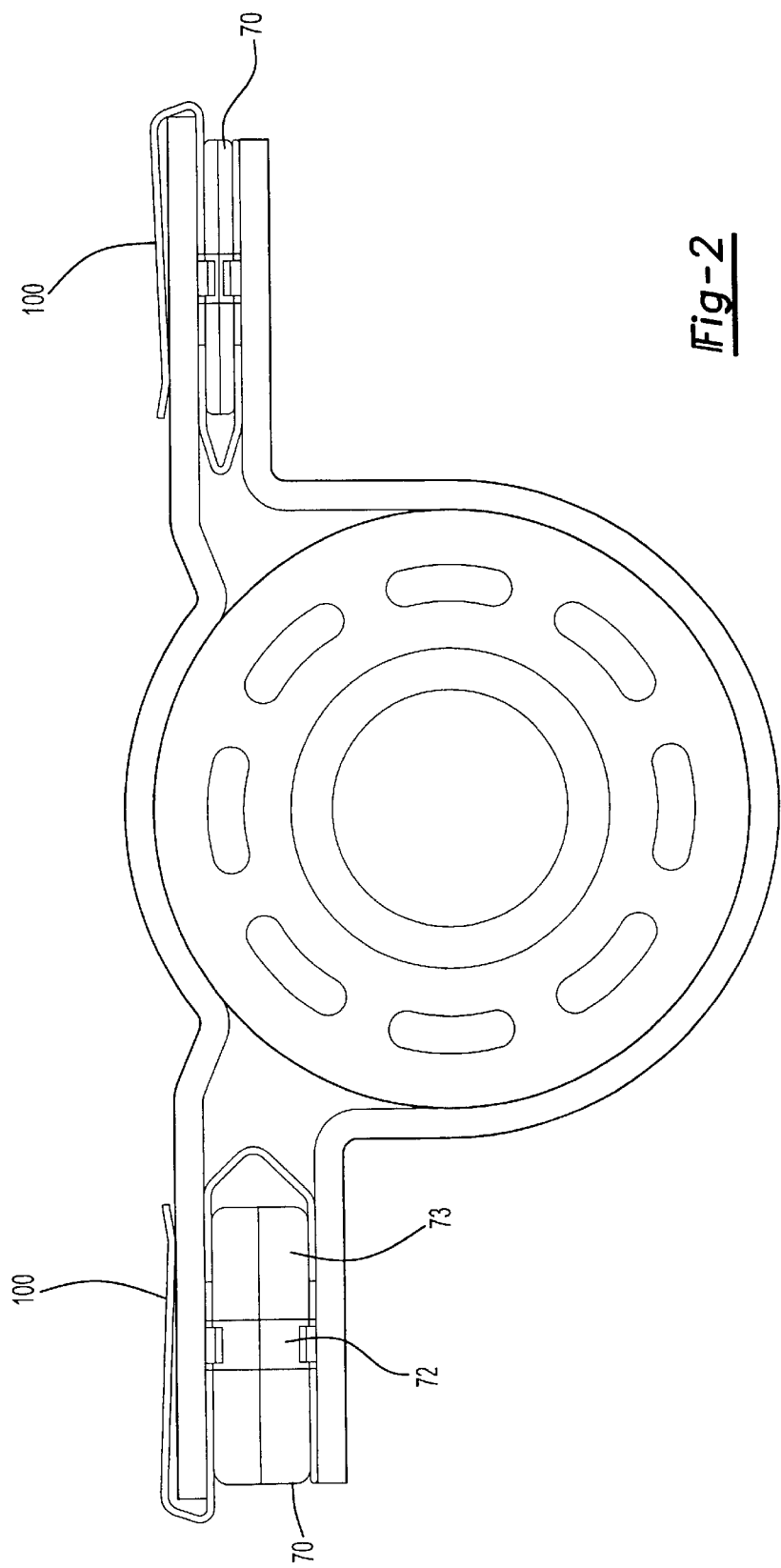
FIG. 2 is an end view showing a yoke and center bearing assembly with the common shim carrier (100) and shims (70) in a fully assembled and mounted position.
Figure 6:
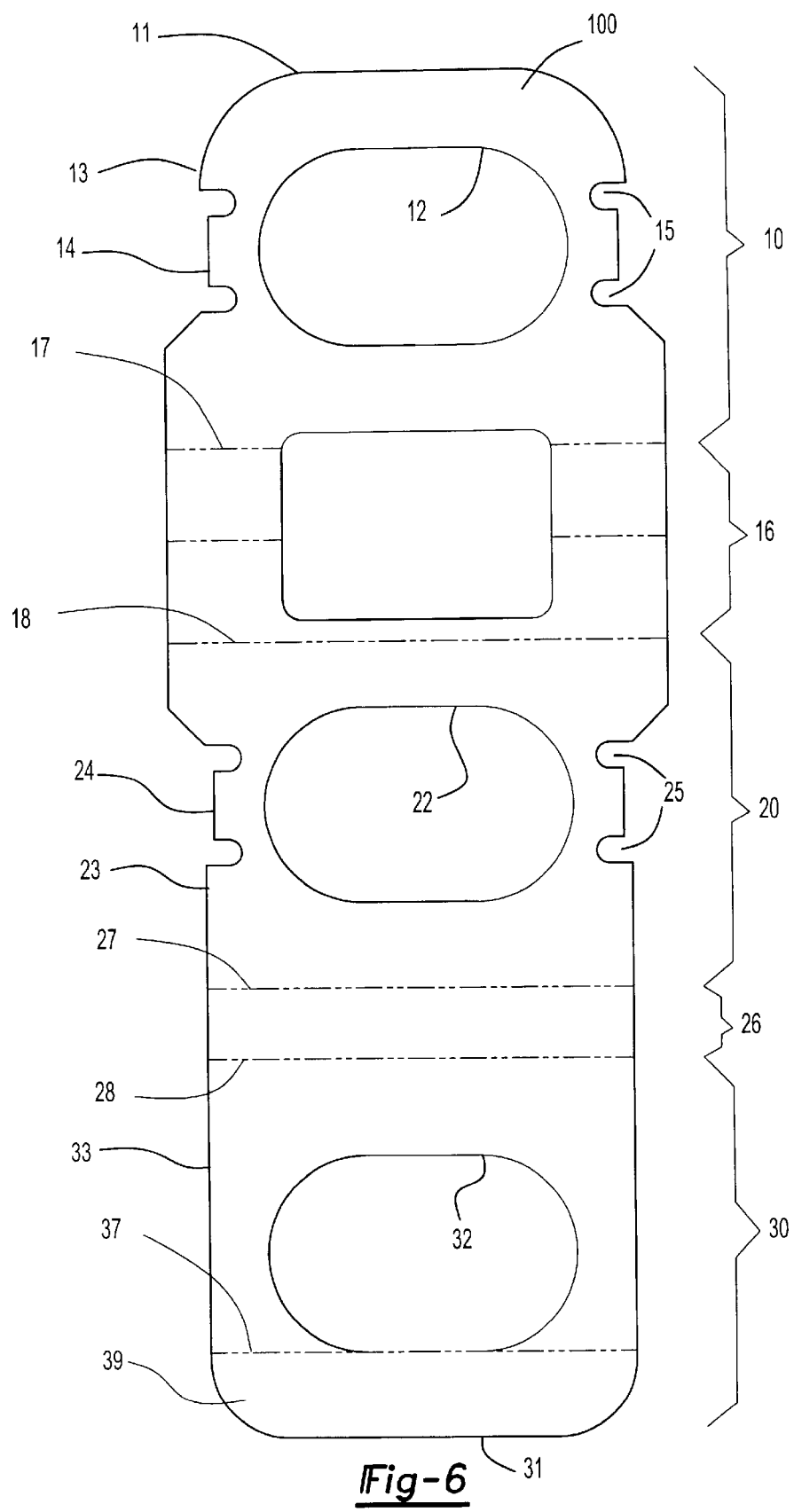
FIG. 6 is a flattened plan view of the preferred essentially "S" shaped common shim carrier (100) embodiment with the three layered intercontiguated planar portions (10), (20) and (30); transition portions (16), (26); contiguated edges (17), (18), (27), (28); lateral edges (13), (23), (33); notches (15), (25); and tabs (14), (24) formed from said notches.

In the preferred embodiment of FIG. 6, as shown in FIGS. 1 and 2, shims 70 are captured between the first 10 and second 20 generally parallel planar portions. The second 20 and third 30 planar portions form a clip portion having the folded up flap 39 of the third planar portion at one end of the shim carrier. The flap 39 assists in sliding the clip portion 20, 30 onto a support flange (workpiece) for holding the shim carrier assembly 100, 70 on the flange of the propeller shaft center bearing with the shims between the first 10 and second 20 planar portions positioned between the flange (workpiece) and a support strap (workpiece) for providing a predetermined spacing between the workpieces as shown in FIGS. 1 and 2.

The essentially flattened shim carrier 100 of FIG. 6 is folded about the first 17 and second 18 contiguated edges of the first planar portion 10 and the third 27 and fourth 28 contiguated edges of the second planar portion 20 to form the third planar portion 30 of the "S" shaped shim carrier. Notches 15 are provided on opposite sides of the first planar portion 10, and notches 25 are provided opposite sides of the second planar portion 20, forming the tabs 14 along the lateral edge 13 and the tabs 24 along the lateral edge 23 to retain the shims 70. The folded-up flap 39 is then formed from folding about the fold line 37 in the third planar portion 30, thus completing the "S" shaped shim carrier assembly 100 for retaining shims 70.

As shown in FIGS. 1–2, the shim carrier assembly 100 slides onto the propeller shaft center bearing to allow the propeller shaft center joint to operate at the desired orientation. This is achieved by positioning the shim carrier assembly 100 between the center bearing and the body when the propeller shaft is installed to the vehicle. Ultimate retention is then provided by the shim carrier assembly 100 with the fasteners that hold the propeller shaft to the body.

The subject invention minimizes the number of subcomponent shims 70 by allowing shim stock of various thicknesses to be assembled into a common shim carrier 100. Various thicknesses can be achieved with the use of separate shim blanks. The shim carrier 100 is common between all shim thicknesses. Common washers may also be used within the shim carrier.

Various other modifications to the present invention may occur to those skilled in the art to which the present invention pertains. For example, the original flattened blank, forming the intercontiguated planar portions from which the shim carrier assembly 100 is fabricated, could be an essentially in-line straight configuration as illustrated in FIGS. 3–6; or could be essentially "I", "L", "C", "T", "t", "U", "E" shaped, etc.

Figure 3:
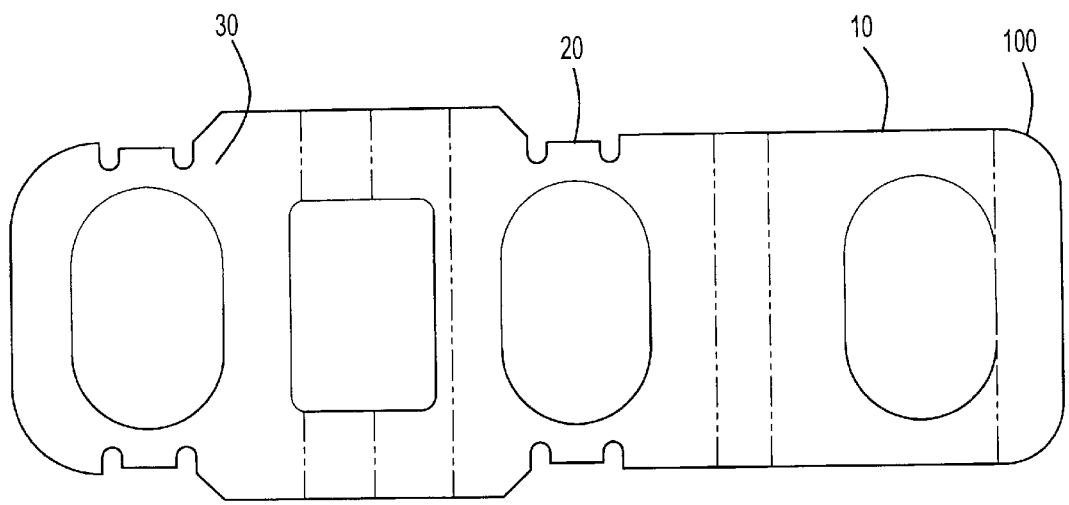
FIGS. 3–5 show various flattened and unfolded plan view configuration embodiments of the common shim carrier (100) with the first (10), second (20), and third (30) intercontiguated planar portions.
Figure 4:
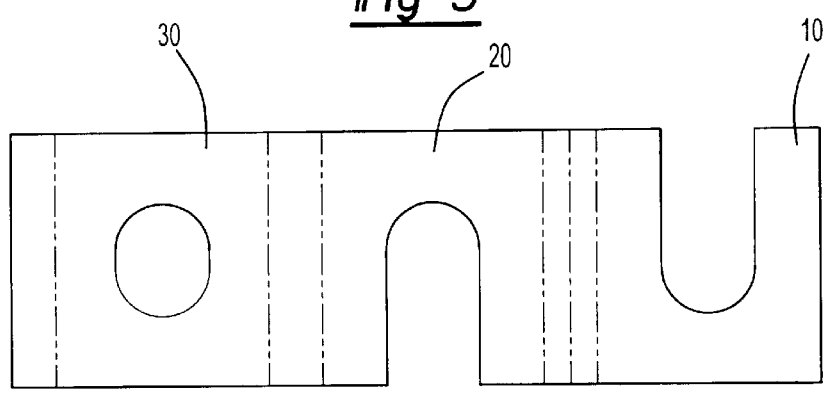
Figure 5:
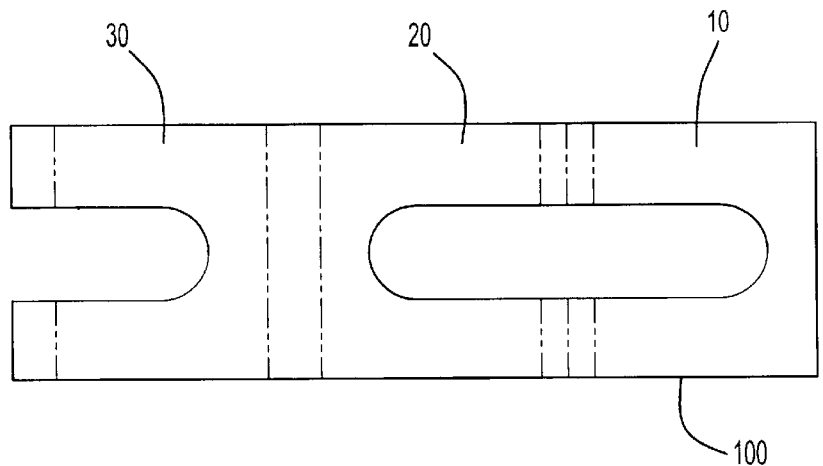

The intercontiguated planar portion segments are essentially rectangular in shape as in FIGS. 4–5; however, they could also have rounded corners as in FIGS. 3 and 6, or circular segments resembling "chain links," or any other geometric configuration. The completed fabricated shim carrier assembly may be essentially "S" shaped in the end view as shown in FIGS. 1 and 2, but could be "C" shaped, or "E" shaped, or the like, depending upon the shape of the original flattened blank from which it is fabricated, and how it is folded about the intercontiguated edges.

The shim carrier 100, as well as shim stock blanks, can be formed from various materials. Although the shim carrier 100 in the preferred embodiment is formed from sheet metal, it could be fabricated from other materials as well. For example, the shim stock blanks could well be made of non-metallic materials such as rubber, plastic, or even wood.

Other modifications not explicitly mentioned herein are also possible and within the scope of the present invention. It is the following claims, including all equivalents, which define the scope of the present invention.

What is claimed is:

1. A shim carrier for retaining shims therein, comprising first, second and third intercontiguated planar portions arranged generally parallel to one another, with attachment means provided for a fastener shaft to pass generally perpendicular through each of said planar portions, and wherein at least one planar portion includes at least one retainer for receiving and capturing at least one shim between said one planar portion and an adjacent planar portion, wherein said at least one retainer is integrally formed along at least one edge of said one planar portion.

2. A shim carrier according to claim 1, wherein said shim carrier is made of a sheet metal material.

3. A shim carrier according to claim 1, wherein said shim carrier is formed from a substantially flattened in-line blank.

4. A shim carrier according to claim 1, wherein said planar portions overlap and are spaced apart, generally parallel to one another.

5. A shim carrier according to claim 1, wherein an end view cross section of said shim carrier is essentially "S" shaped.

6. A shim carrier according to claim 1, wherein said attachment means for said fastener shaft is provided by apertures defining a hole or slot in each said planar portion and wherein said fastener shaft may pass through all said holes or slots in a direction generally perpendicular to said planar portions.

7. A shim carrier assembly comprising:
a shim carrier including first, second and third intercontiguated planar portions arranged generally stacked and parallel to one another; and
at least one shim, generally the same size as said planar portions, disposed between an adjacent two of said planar portions;

wherein each of said planar portions and said at least one shim has a hole or slot defined therein such that a fastener shaft may pass through all of said holes or slots in a direction generally perpendicular to said planar portions; and wherein at least one retainer is provided for retaining said at least one shim.

8. A shim carrier assembly according to claim 7, wherein said at least one retainer is provided by at least one folded tab formed between notches along at least one lateral edge of one of said adjacent two planar portions and a folded-up flap portion is provided on a third planar portion at one end of the said shim carrier assembly.

9. An essentially "S" shaped shim carrier assembly including shims retained therein, the assembly comprising:

first, second, and third intercontiguated planar portions arranged generally stacked, spaced apart, and parallel to one another, further including lateral and end edges;

at least one shim disposed between an adjacent two of said planar portions;

a pair of notches further disposed along the lateral edges of each of said two adjacent planar portions;

said pairs of notches further defining foldable tabs retaining said shims;

first and second transition portions with foldable contiguated edges connecting said planar portions to form said shim carrier;

a folded-up flap portion in a third planar portion at one end of said planar portion of said shim carrier; and wherein each of said planar portions and said at least one shim has an aperture defining a hole or slot therein such that a fastener shaft may pass through all of said holes or slots in a direction generally perpendicular to said planar portions of said shim carrier assembly.

10. A shim carrier according to claim 1, wherein said at least one retainer comprises at least one folded tab formed between notches along a lateral edge of said one planar portion.

11. A shim carrier assembly for use in interconnecting first and second substantially planar workpieces, said shim carrier assembly comprising:

a shim carrier including first, second and third intercontiguated planar portions arranged generally parallel to one another;

at least one shim, generally the same size as said parallel planar portions, retained between said first and second generally parallel planar portions for providing a predetermined spacing between said workpieces when fastened between the workpieces in a final assembly; and said second and third parallel portions forming a clip attachable to one of the workpieces for positioning the shim and the first and second planar portions between the workpieces in the final assembly.

* * * * *